United States Patent [19]

David-Malig

[11] 4,218,941
[45] Aug. 26, 1980

[54] METHOD AND TOOL FOR MACHINING A TRANSVERSE SLOT ABOUT A BORE

[76] Inventor: Robert A. Frosch, Administrator of the National Aeronautics and Space Administration, with respect to an invention of Manuel A. David-Malig, Morgan Hill, Calif.

[21] Appl. No.: 953,314

[22] Filed: Oct. 17, 1978

[51] Int. Cl.³ .................. B23B 3/00; B23B 35/00; B23B 41/00
[52] U.S. Cl. .................. 82/1 C; 82/1.2; 82/36 R; 407/85; 407/117; 408/1 R
[58] Field of Search .............. 407/85, 86, 87, 117; 82/1 C, 36 R, 1.2; 408/1 R

[56] References Cited

U.S. PATENT DOCUMENTS

| | | | |
|---|---|---|---|
| 1,779,059 | 10/1930 | Burkart et al. | 407/86 |
| 2,751,006 | 6/1956 | Lane | 407/85 |
| 2,771,798 | 11/1956 | De Vlieg | 82/1.2 |
| 2,954,570 | 10/1960 | Couch | 407/87 |
| 3,088,141 | 5/1963 | Tansey | 407/86 |
| 3,245,288 | 4/1966 | Fried | 407/117 |
| 3,246,545 | 4/1966 | Shugars | 82/1.2 |
| 3,389,620 | 6/1968 | Berruyer | 82/1.2 |
| 4,043,695 | 8/1977 | Gottelt | 408/1 R |

Primary Examiner—Harrison L. Hinson
Attorney, Agent, or Firm—Howard J. Osborn; John R. Manning; John G. Mannix

[57] ABSTRACT

A method and apparatus for cutting a transverse slot about a bore of smaller diameter than that of the slot are disclosed. The invention consists of introducing a cutting head facing transversely to the bore, through the bore opening its distance from the mill shaft being progressively extended by the addition of spacers between the head and the shaft until the desired slot depth is obtained. The spacers are held in position by a cable passing from the cutting head through the series of spacers and out along the mill shaft. The mill shaft carrying the cutting head is moved transversely into the object wherein the slot is being cut as the object is being rotated thereabout by the mill table to which it is affixed.

7 Claims, 6 Drawing Figures

METHOD AND TOOL FOR MACHINING A TRANSVERSE SLOT ABOUT A BORE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; USC 2457).

BACKGROUND OF THE INVENTION

The present invention relates to a machining tool and more particularly to a tool for machining a circular transverse slot through a relatively small diameter bore.

In the manufacture of a solid rocket motor it became necessary to cut a seventeen inch diameter transverse slot six tenths of an inch wide through an approximately three inch opening in the rocket motor casing. The conventional fold out cutting tool is not technically feasible in this application and the prior art affords no tools to accomplish this task.

The present invention is composed of a shaft, a cutting head, oriented perpendicular to the longitudinal axis of the shaft, and a plurality of spacers positionable between the cutting head and the shaft. An adjustable cable is attached to the cutting head and extends through the spacers to the shaft. The spacers are added progressively to extend the distance between the cutting head and the shaft to deepen the cut.

It is an object of the invention to provide a method and a cutting tool for milling a transverse slot in a bore having a smaller diameter than the slot.

It is another object of the present invention to provide a method and a cutting tool for milling a circumferential slot, in a bore, out to a recess substantially greater than the diameter of the bore.

A further object of the present invention is a cutting tool yielding the foregoing advantages and which is economical, easy to use and simple to construct.

A further object of the invention is a cutting tool yielding the foregoing advantages and which may be incrementally extended to cut the desired slot depth.

Other objects and advantages of the present invention will be readily apparent from the following description and drawings which illustrate the preferred embodiments of the invention.

SUMMARY OF THE INVENTION

The present invention involves a method and apparatus for cutting a transverse slot about a bore of smaller diameter than that of the slot. The method consists of inserting a cutting tool into the bore of the object to be cut, rotating the object about the bore, and moving the cutting tool transversely into the side of the bore of the object to cut the slot. The cutting diameter of the tool is incrementally extended to progressively cut a larger diameter slot by inserting spacers between the cutting head and the shaft of the tool.

The cutting tool for performing the method includes a shaft, a cutting head aligned to cut a transverse slot, a plurality of spacers positionable between the cutting head and the shaft and a cable affixed to the cutting head and extending therefrom through the spacers and through the shaft and being adjustable in length and tension. Upon obtaining maximum slot depth, for a given number of spacers, machining ceases, the cable is slackened, an additional spacer is added, the cable is retightened and machining recommences. The steps are repeated until the desired slot depth is obtained.

DESCRIPTION OF THE PREFERRED EMBODIMENT

Figure 1:
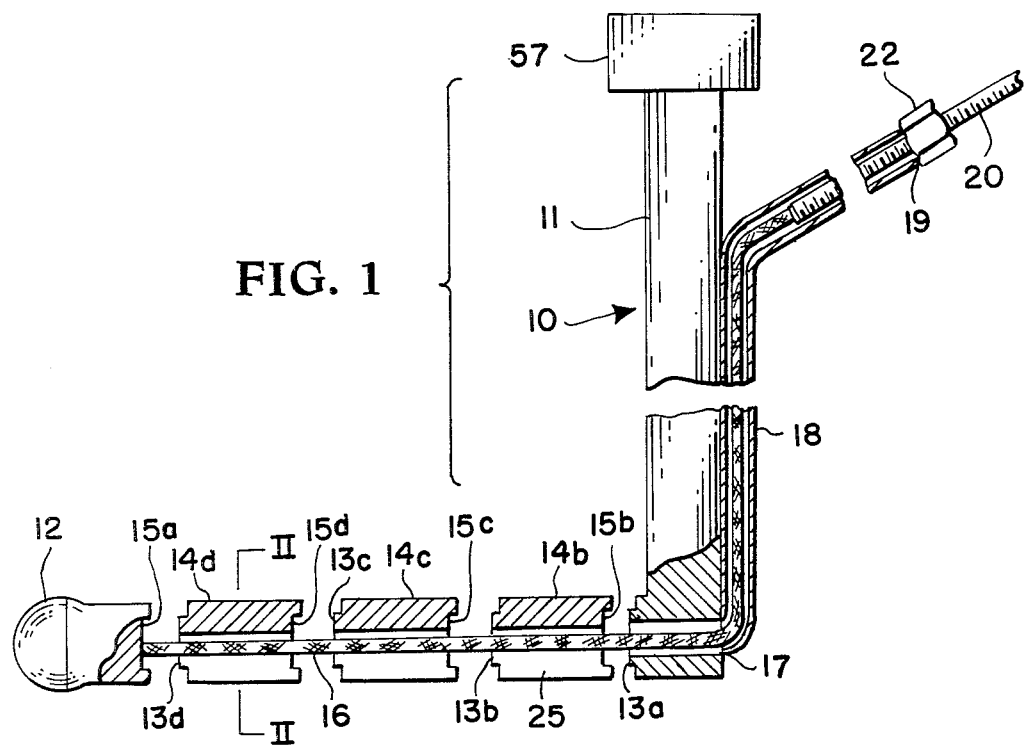
FIG. 1 is an elevational partial cutaway view of the preferred embodiment of the present invention.
Figure 3:
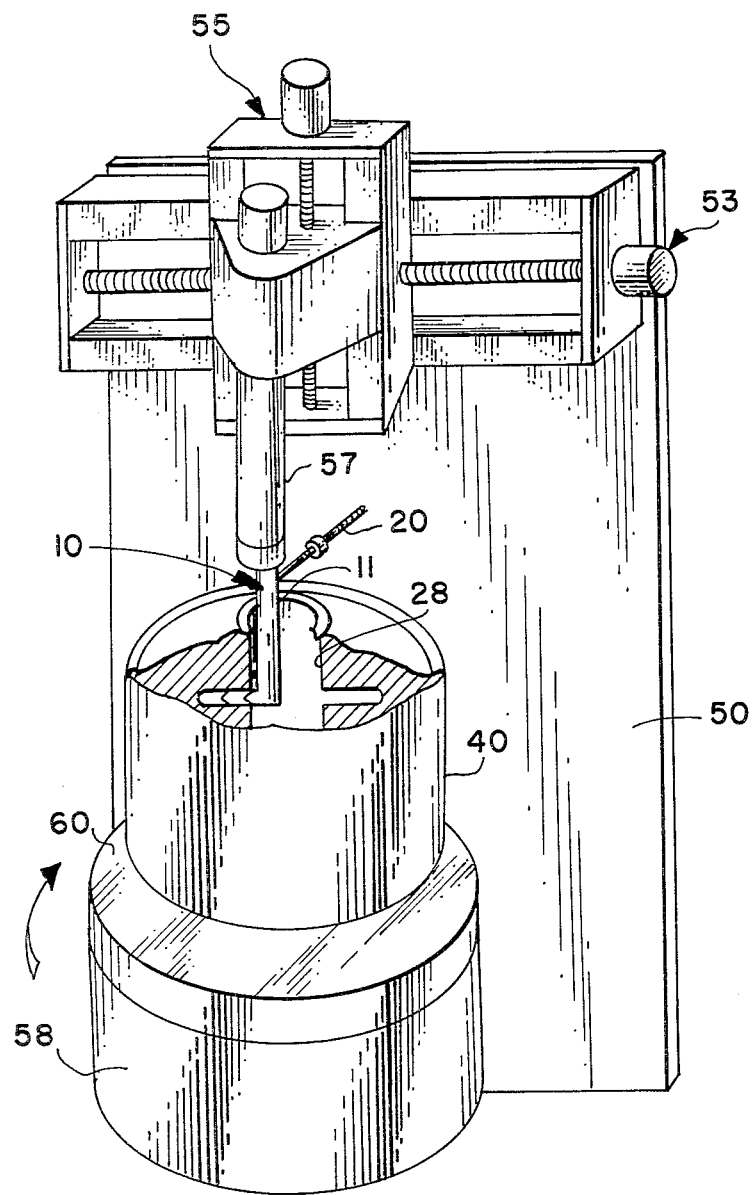
FIG. 3 is a schematic view showing the preferred embodiment of the present invention in use on a milling machine.

Referring to FIG. 1, a partial cutaway view of the preferred embodiment of the present invention is shown. Shaft 11 of the cutting tool designated generally by the reference numeral 10 is fixable at its upper end to a milling machine (FIG. 3). Hole 17 extends through the lower end of shaft 11 and is approximately perpendicular to the longitudinal axis thereof. Male interlocking face 13a of shaft 11 is parallel to the longitudinal axis thereof and includes one end of hole 17. The cutting head 12 of tool 10 is aligned transversely to the longitudinal axis of shaft 11. The material and shape of cutting head 12 may be selected to be suitable for cutting the particular object being machined by one ordinarily skilled in the art. Cutting head 12 has a female interlocking face 15a being shaped to interlockingly mate with male interlocking faces 13a, 13b, 13c, or 13d.

Spacers 14b, 14c, and 14d are cylindrical having male interlocking faces 13b, 13c, and 13d respectively at one end and female interlocking faces 15b, 15c, and 15d respectively at the opposing end. For purposes of illustration, three spacers are shown, however, it is understood that any number of spacers may be utilized in the present invention.

Figure 2:
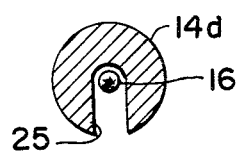
FIG. 2 is a sectional view of a spacer taken along line II-II of FIG. 1.

Referring now to FIG. 2, a sectional view of spacer 14d of the preferred embodiment is shown. Spacers 14b and 14c are similarly constructed. Slot 25 extends longitudinally through spacer 14d and radially from the perimeter thereof to approximately the center thereof. Slot 25 is of sufficient width to receive cable 16 and is contoured to smoothly interface therewith.

Refer now back to FIG. 1. Cable guide 18 is a hollow tube for guiding and protecting cable 16 passing therethrough. The lower end of cable guide 18 corresponds with hole 17 of shaft 11. Cable guide 18 extends along shaft 11 and bends away therefrom at the upper portion of shaft 11, and subsequently terminates. Alternatively to extending along shaft 11, cable guide 18 may extend in part longitudinally therethrough.

A flexible cable 16 is fixedly attached to cutting head 12 at face 15a thereof and extends through hole 17 of shaft 11 and partially through cable guide 18 and is affixed at its end to the end of a tension screw 20. Tension screw 20 extends from the end of cable 16 through cable guide 18 and protrudes out the end thereof. Nut 22 rests upon end 19 of cable guide 18 and threadingly engages tension screw 20 for adjusting the tension of cable 16 attached thereto. Rotating nut 22 translates tension screw 20 relative to the end 19 of cable guide 18 resulting in a change of distance between cutting head 12 and shaft 11. When cutting head 12 is precluded from being drawn any further toward shaft 11 because of contact therewith or contact with spacers positioned therebetween, further adjustment of nut 22 results in increasing the tension of cable 16. Cable 16 may be composed of any suitable material and may be solid or chainlink.

When extension of the cutting tool is desired, cable 16 is slackened and a spacer is positioned on cable 16 between shaft 11 and cutting head 12 or a previously added spacer. Cable 16 is then tightened, locking the spacer cutting head 12 and shaft 11 together. Spacers 14b, 14c and 14d are sized to enable easy positioning thereof on cable 16 between cutting head 12 and shaft 11 when tool 10 is in cutting position in bore 28. Thus, longer spacers may be used with larger bore dimensions. The insertion of spacers may be accomplished by hand, or in such circumstances where either the distance from the slot position to the end of bore 28 or the smallness of the bore dimension precludes insertion of spacers by hand, a simple tool (not shown) such as a pair of tweezers or tongs or other appropriate tool may be used for positioning the spacers.

Refer to FIG. 3. In operation of the invention, the cutting tool 10, is mounted on a milling machine 50 and is positioned into the bore 28 of the rocket motor by vertical feed mechanism 55. Rocket motor 40 is mounted on rotating table 60 being turned by rotating means 58. As motor 40 is rotated, tool 10 is moved transversely into the wall of bore 28 by the horizontal feed mechanism 53 of milling machine 50.

Figure 4:
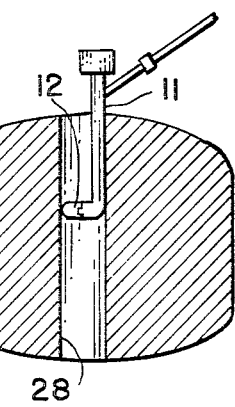
FIG. 4 is a schematic view showing the preferred embodiment of the present invention in position prior to cutting.
Figure 5:
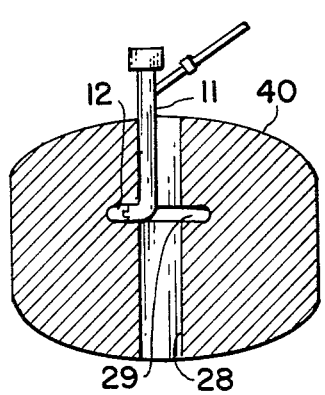
FIG. 5 is a schematic view similar to FIG. 4 subsequent to cutting a slot.
Figure 6:
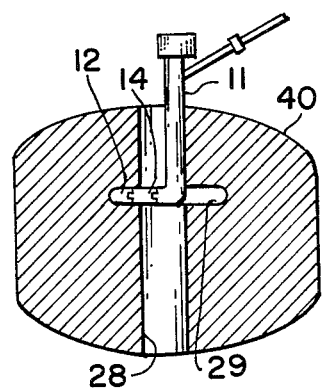
FIG. 6 is a schematic view similar to FIG. 4 showing the addition of a spacer.

Refer now to FIGS. 4–6 which illustrate the method whereby the slot depth is incrementally extended. As shown in FIG. 4, cutting head 12 is directly mated with shaft 11 without the use of spacers such as spacers 14b, 14c, or 14d shown in FIG. 1. However, in application of the invention, as many spacers may be added initially as the diameter of bore 28 allows.

Referring now to FIG. 5, rocket motor 40 is rotated as cutting head 12, being held against shaft 11 by tensioned cable 16, is moved transversely into the wall to cut slot 29. When shaft 11 of tool 10 comes in proximity to the wall of bore 28, maximum slot depth has been reached. To increase slot depth, rotation of rocket motor 40 is stopped, cable 16 is slackened, and tool 10 is backed off to allow the addition of spacer 14 as shown in FIG. 6. Cable 16 is tightened and the steps of cutting, backing off, and adding spacers are repeated until the desired length of slot 29 is reached.

The above described description and drawings are only illustrative of a preferred embodiment which achieves the objects, features and advantages of the present invention, and it is not intended that the present invention be limited thereto. And modifications of the present invention which come within the spirit and scope of the following claims are considered part of the present invention.

What is claimed as new and desired to be secured by Letters Patent of the United States is:

1. A method for machining a transverse slot of first dimension through a bore of second dimension being smaller than said first dimension comprising the steps of:
   (a) providing an object to be machined having a bore of said second dimension;
   (b) providing a cutting tool having a cutting head and being insertable into said bore of said second dimension;
   (c) providing a tensioning means for urging said cutting head toward said tool;
   (d) providing a plurality of spacers insertable between said cutting head and said cutting tool;
   (e) applying said tensioning means to affix said head to said tool;
   (f) positioning said cutting tool in said bore;
   (g) rotating said object to be machined about the longitudinal axis of said bore;
   (h) moving said cutting head transversely into said object being rotated to cut a transverse slot in said object about said bore;
   (i) ceasing rotation of said object upon said shaft contacting the wall of said bore;
   (j) releasing said tensioning means and moving said cutting tool away from said cutting head;
   (k) inserting at least one of said plurality of spacers between said cutting head and said cutting tool;
   (l) applying said tensioning means to affix said cutting head and said at least one of said plurality of spacers to said tool;
   (m) rotating said object to be machined about the longitudinal axis of said bore;
   (n) moving said cutting head transversely into said object being rotated to deepen the slot being cut transversely about said bore; and
   (o) repeating steps (i) through (n) until said slot is cut to said first dimension.

2. A cutting tool for machining, from inside a bore through an object, a transverse slot of larger dimension than the dimension of said bore comprising:
   a shaft positionable in said bore;
   a cutting head attached to and aligned with said shaft to cut a transverse slot;
   means for rotating said object about said shaft;
   means for moving said shaft and said cutting head transversely into said object; and
   means for extending the distance of said cutting head from said shaft, while said cutting head remains in said transverse slot, to a distance substantially greater than the dimension of said bore.

3. A cutting tool as in claim 2 wherein said extension means comprises:
   at least one spacer positionable between said cutting head and said shaft; and
   attachment means for attaching said cutting head and said at least one spacer to said shaft.

4. A cutting tool as in claim 5 wherein said attachment means comprises:
   a cable fixed to said cutting head and extending therefrom through said at least one spacer and through said shaft; and
   cable tensioning means for adjusting said cable in length and tension.

5. A cutting tool as in claim 4 wherein said one spacer is slotted to receive said cable and wherein said cutting head, said one spacer, and said shaft include interlocking faces.

6. A cutting tool as in claim 5 further comprising a cable guide positioned along the length of said shaft having said cable extending therethrough and wherein said object to be machined consists of a solid propellant rocket motor.

7. A cutting tool as in claim 5 further comprising a cable guide positioned in part along the length of said shaft and in part longitudinally through said said shaft having said cable extending therethrough and wherein said cable tensioning means comprises a screw attached to the end of said cable, a nut threadingly engaging said screw and resting on the end of said cable guide, said nut being rotatable to adjust the length and tension of the cable.

* * * * *